(12) United States Patent
Bandai

(10) Patent No.: US 11,636,692 B2
(45) Date of Patent: Apr. 25, 2023

(54) INFORMATION PROCESSING DEVICE, INFORMATION PROCESSING SYSTEM, AND RECORDING MEDIUM STORING INFORMATION PROCESSING PROGRAM

(71) Applicant: TOYOTA JIDOSHA KABUSHIKI KAISHA, Toyota (JP)

(72) Inventor: Hiroyuki Bandai, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 17/067,071

(22) Filed: Oct. 9, 2020

(65) Prior Publication Data

US 2021/0142079 A1 May 13, 2021

(30) Foreign Application Priority Data

Nov. 11, 2019 (JP) .............................. JP2019-204265

(51) Int. Cl.
| | |
|---|---|
| G06V 20/58 | (2022.01) |
| G06T 7/70 | (2017.01) |
| H04W 4/44 | (2018.01) |
| B60W 30/095 | (2012.01) |
| G08G 1/16 | (2006.01) |

(52) U.S. Cl.
CPC ....... *G06V 20/584* (2022.01); *B60W 30/0956* (2013.01); *G06T 7/70* (2017.01); *G08G 1/164* (2013.01); *H04W 4/44* (2018.02); *B60W 2420/42* (2013.01); *G06T 2207/30252* (2013.01)

(58) Field of Classification Search
CPC ............ G06V 20/584; B60W 30/0956; B60W 2420/42; G06T 7/70; G06T 2207/30252; G08G 1/164; H04W 4/44
USPC ......................................................... 382/104
See application file for complete search history.

(56) References Cited

U.S. PATENT DOCUMENTS

| | | | |
|---|---|---|---|
| 2016/0165188 A1* | 6/2016 | Chundrlik, Jr. ........... B60R 1/12 | 348/148 |
| 2017/0278321 A1* | 9/2017 | Nishida .................. G08G 1/164 | |
| 2020/0168099 A1 | 5/2020 | Yamaguchi et al. | |

FOREIGN PATENT DOCUMENTS

| | | |
|---|---|---|
| JP | 2006-221459 A | 8/2006 |
| JP | 2017-174244 A | 9/2017 |
| JP | 2018-180810 A | 11/2018 |
| JP | 2019-045908 A | 3/2019 |
| JP | 2019-106041 A | 6/2019 |
| WO | 2018/225178 A1 | 12/2018 |

* cited by examiner

*Primary Examiner* — Ayodeji O Ayotunde

(74) *Attorney, Agent, or Firm* — Sughrue Mion, PLLC

(57) ABSTRACT

An information processing device that receives, from each of several vehicles, both image information captured by an image capture device installed at the vehicle, and vehicle information including position information on the vehicle; performs image processing identifying a characteristic of a dangerously-driven vehicle based on the image information; and in a case in which a dangerously-driven vehicle has been detected, modifies a priority level for image processing of the image information received from another vehicle in the vicinity of a vehicle that has detected the dangerously-driven vehicle, so as to be higher than for a vehicle not in the vicinity of the vehicle that has detected the dangerously-driven vehicle.

8 Claims, 6 Drawing Sheets

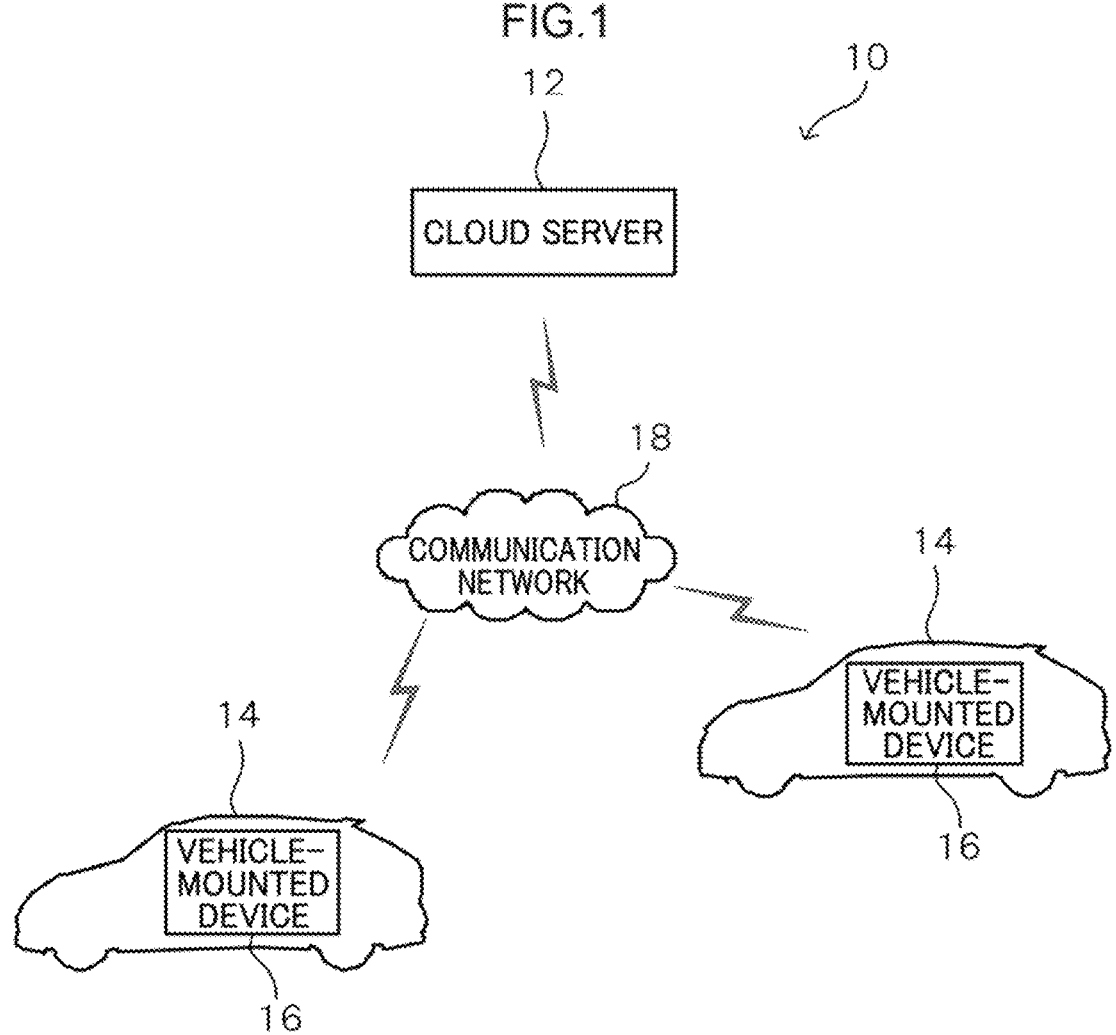

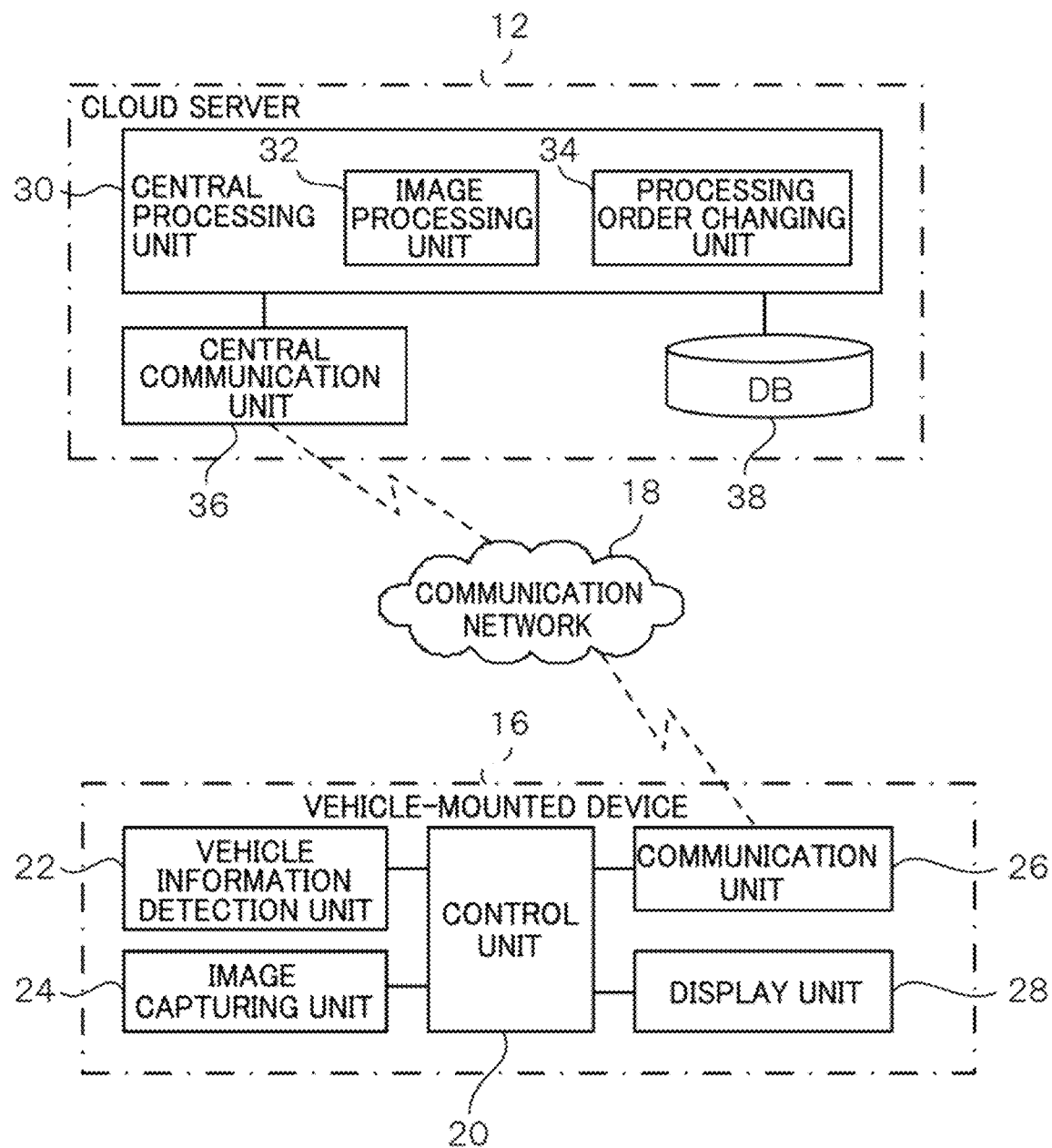

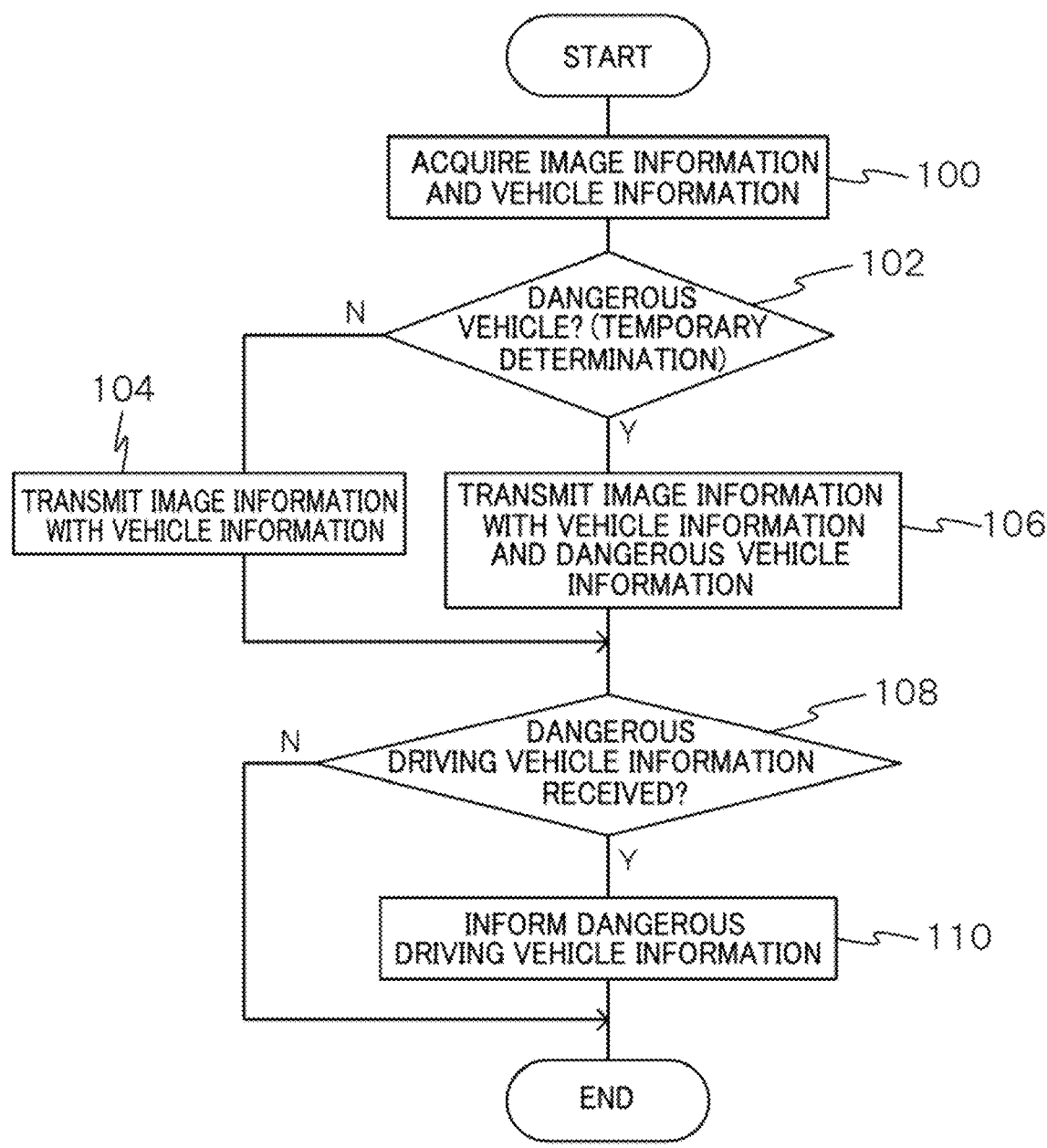

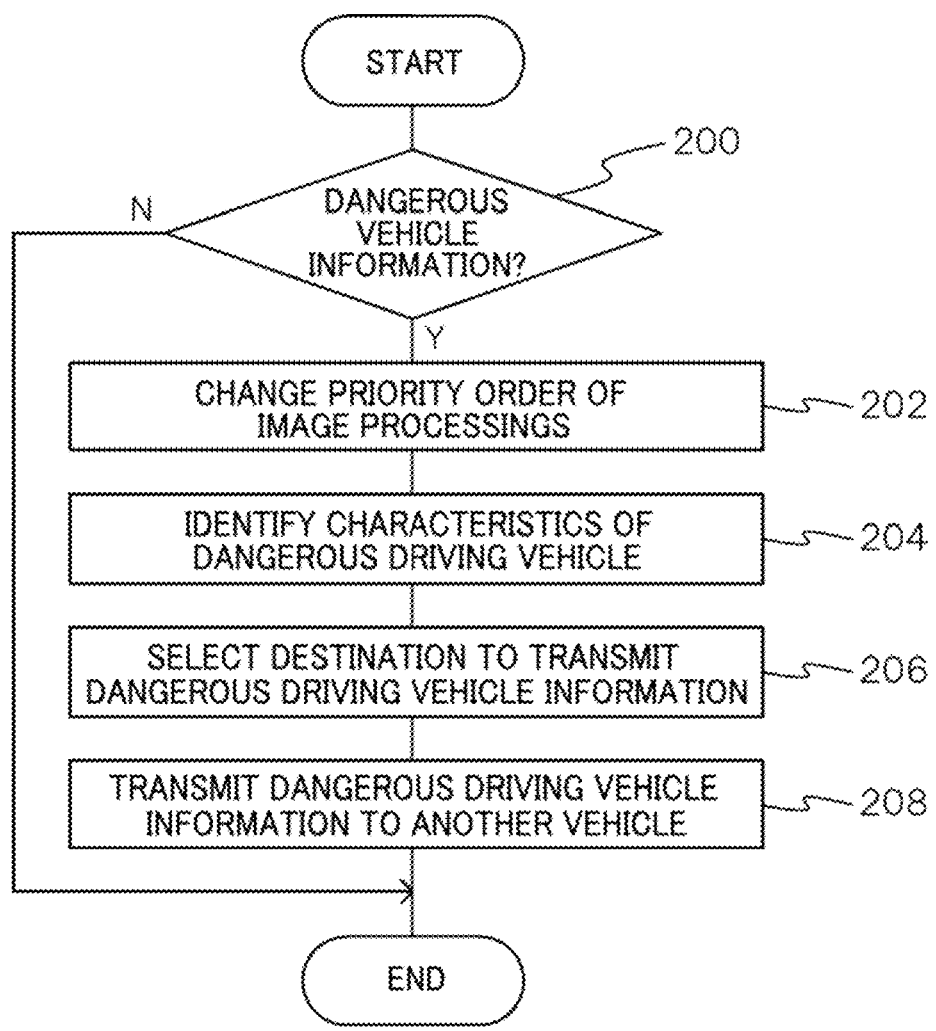

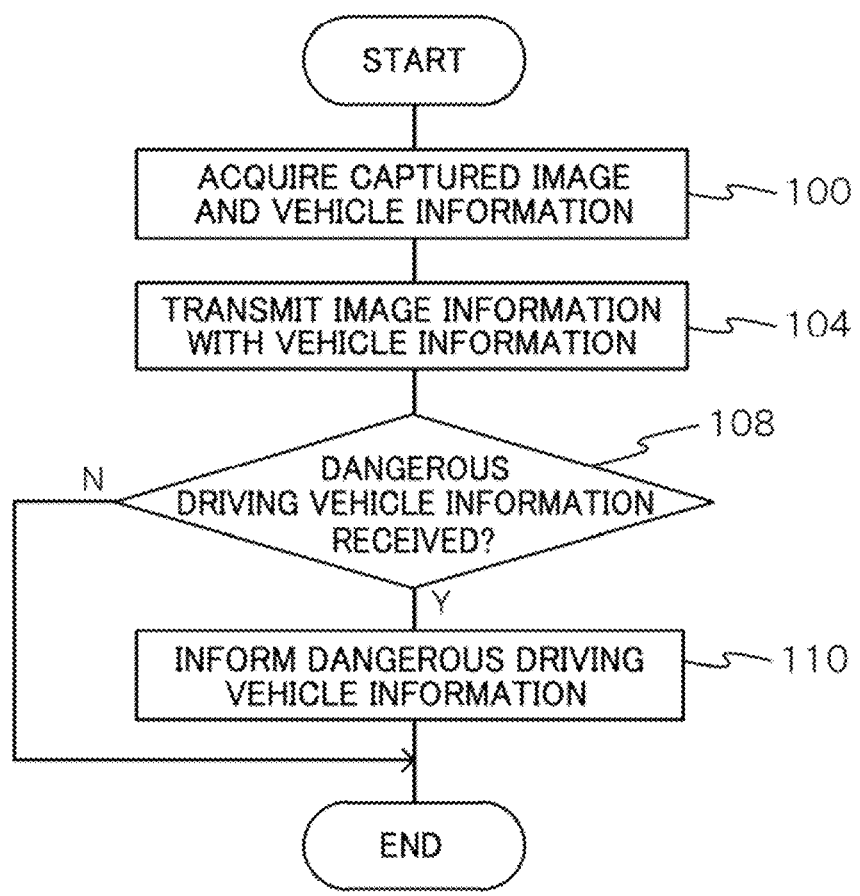

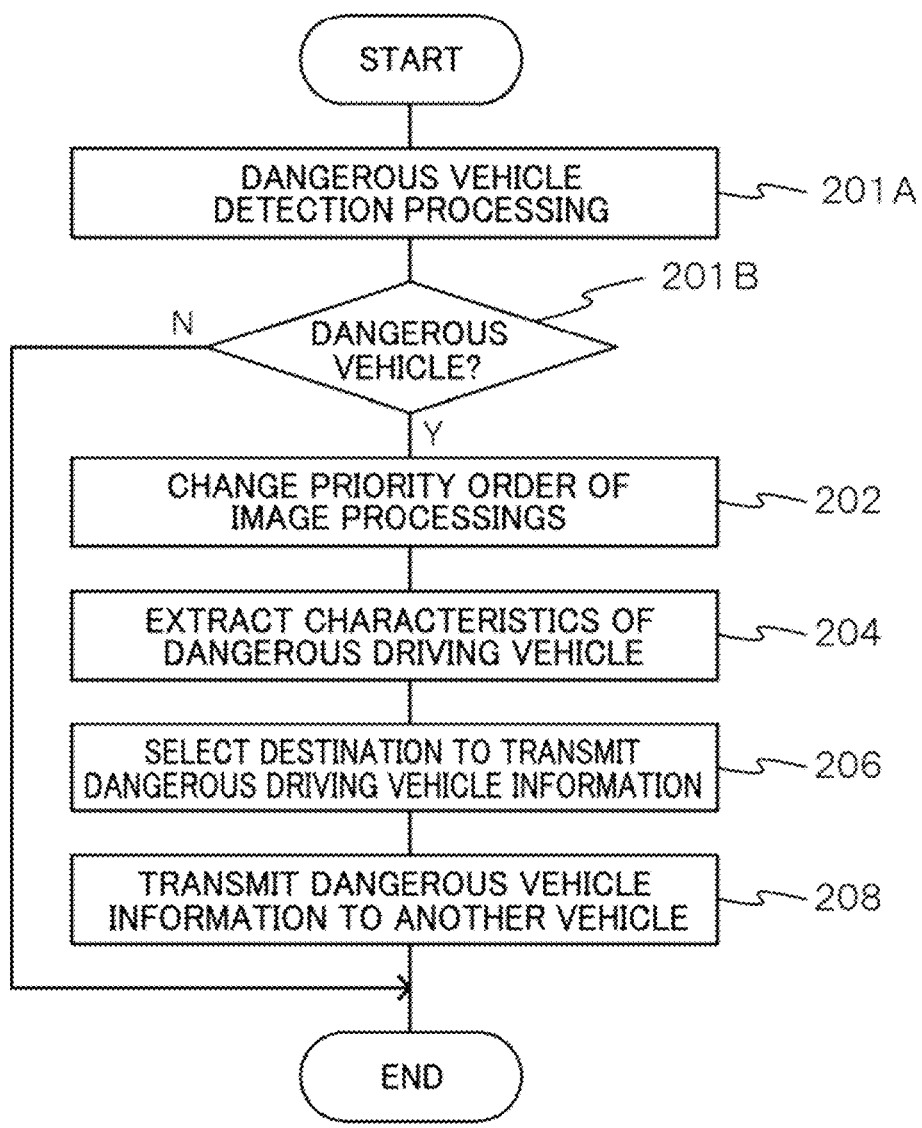

INFORMATION PROCESSING DEVICE, INFORMATION PROCESSING SYSTEM, AND RECORDING MEDIUM STORING INFORMATION PROCESSING PROGRAM

CROSS-REFERENCE TO RELATED APPLICATION

This application is based on and claims priority under 35 USC 119 from Japanese Patent Application No. 2019-204265 filed on Nov. 11, 2019, the disclosure of which is incorporated by reference herein.

BACKGROUND

Technical Field

The present disclosure relates to an information processing device, an information processing system, and a recording medium storing an information processing program

Related Art

With the advent of connected cars having a function of connecting to a communication network such as the Internet, it is now possible to receive various information services by communicating with a cloud server.

For example, in Japanese Patent Application Laid-open No. 2017-174244, an information providing device is proposed that is connected via a network to a vehicle controlled based on recognition results by an external world recognition technology, and that provides a vehicle with information about the possibility of failure of external recognition based on conditions when external world recognition failure has occurred in the past. In detail, when a failure such as non-detection or erroneous detection occurs in the external environment recognition device of the connected car, it has been proposed to store the abnormality in association with the external traveling environment such as the vehicle position and the weather.

However, in the technique disclosed in Japanese Patent Application Laid-Open No. 2017-174244, various information from the connected car needs to be collected in an information processing device such as a cloud server and a large amount of information processing must be performed, resulting in a high processing load and a delayed response, and there is room for improvement.

SUMMARY

One aspect of the present disclosure is an information processing device, including: a receiver unit configured to receive, from each of several vehicles, both image information captured by an image capture device installed at the vehicle, and vehicle information including position information on the vehicle; an image processing unit configured to perform image processing identifying a characteristic of a dangerously-driven vehicle based on the image information; and a modification unit configured to, in a case in which a dangerously-driven vehicle has been detected, modify a priority level for image processing of, among the image information received by the receiver unit, the image information received from another vehicle in the vicinity of a vehicle that has detected the dangerously-driven vehicle, so as to be a higher priority than for a vehicle that is not in the vicinity of the vehicle that detected the dangerously-driven vehicle.

BRIEF DESCRIPTION OF DRAWINGS

FIG. 1 is a block diagram illustrating a schematic configuration of an information processing system according to the present embodiment.

FIG. 2 is a block diagram showing a configuration of an in-vehicle device and a cloud server in the information processing system according to the present embodiment.

FIG. 3 is a flowchart showing an example of a flow of processing performed by the vehicle-mounted device of the information processing system according to the first embodiment.

FIG. 4 is a flowchart illustrating an example of a flow of processing performed by a cloud server of the information processing system according to the first embodiment.

FIG. 5 is a flowchart illustrating an example of a flow of processing performed by an onboard unit of the information processing system according to the second embodiment.

FIG. 6 is a flowchart showing an example of a flow of processing performed by the cloud server of the information processing system according to the second embodiment.

DETAILED DESCRIPTION

An example of an embodiment of the present disclosure is described in detail hereinafter with reference to the drawings. FIG. 1 is a block diagram illustrating a schematic configuration of an information processing system according to the present embodiment.

In an information processing system 10 according to the present embodiment, an in-vehicle device 16 mounted on a vehicle 14, and a cloud server 12 as an information processing device, are connected via a communication network 18. In the information processing system 10 according to the present embodiment, image information obtained via photography by several vehicle-mounted devices 16 is transmitted to the cloud server 12, and the cloud server 12 performs various types of image processing on the transmitted image information. As an example of the type of image processing that is performed is image processing for identifying dangerous driving of a vehicle such as tailgating, pulling-over, swerving, or the like is performed, FIG. 2 is a block diagram showing a configuration of an in-vehicle device 16 and a cloud server 12 in the information processing system according to the present embodiment.

The vehicle-mounted device 16 includes a control unit 20, a vehicle information detection unit 22, a photographing unit 24, a communication unit 26, and a display unit 28.

The vehicle information detection unit 22 detects vehicle information regarding the vehicle 14 including at least the position information of the vehicle 14. As the vehicle information, in addition to the position information, for example, vehicle information such as a vehicle speed acceleration, a steering angle, an accelerator position, and a route may be detected. More specifically, the vehicle information detection unit 22 can apply several types of sensors and devices that acquire information indicating the state of the surrounding environment of the vehicle 14. Examples of the sensors and the devices include a sensor mounted on the vehicle 14 such as a vehicle speed sensor and an acceleration sensor, a GNSS (Global Navigation Satellite System) device, an in-vehicle communication device, a navigation system, and a radar device. The GNSS device receives GNSS signals from several GNSS satellites, and measures the position of the host vehicle. The accuracy of measurement improves in accordance with an increase in the number of GNSS signals that the GNSS device can receive. The in-vehicle communication device is a communication device that carries out at least one of inter-vehicle communications with other vehicles 14 via the communication unit 26, or road-vehicle communications with roadside devices. The navigation system includes a map information storage section that stores map information. On the basis of the position information obtained from the GNSS device and the map information stored in the map information storage section, the navigation system carries out processing that displays the position of the host vehicle 14 on a map and that guides the host vehicle along a route to the destination. The radar device includes several radars whose detection ranges differ from one another. The radar device detects objects such as pedestrians and other vehicles 14 and the like that exist in the surroundings of the host vehicle 14, and acquires relative positions and relative speeds between the detected objects and the host vehicle 14. Further, the radar device incorporates therein a processing device that processes the results of detecting objects in the surroundings. On the basis of changes in the relative positions and the relative speeds between the vehicle and individual objects that are included in recent, several results of detection, and the like, this processing device excludes noise, roadside objects such as guard rails and the like, and the like from objects of monitoring, and tracks and monitors specific objects, such as pedestrians and other vehicles 14 and the like, as objects of monitoring. Further, the radar device outputs information on the relative positions and the relative speeds between the own vehicle and the individual objects of monitoring, and the like.

In the present embodiment, the image capturing unit 24 is provided at the rear of the vehicle 14 and captures an image to the rear of the vehicle 14. Further, the photographing unit 24 may further photograph at least one of the front side or the transverse side of the vehicle 14. Note that the image capturing section 24 may be provided on the vehicle 14 and capture an image of the vehicle surroundings toward at least one of the front, the side, or the rear of the vehicle 14. Further, the photographing unit 24 may further photograph the inside of the vehicle.

The communication unit 26 establishes communication with the cloud server 12 via the communication network 18 and performs transmission and reception of information such as image information obtained by imaging by the imaging unit 24 and vehicle information detected by the vehicle information detection unit 22.

The display unit 28 provides various kinds of information to the occupant by displaying the information. In the present embodiment, a warning about a dangerous driving vehicle is reported by displaying dangerous driving vehicle information provided from the cloud server 12. For example, as the dangerous driving vehicle information, information such as the shape, color and license plate number of a dangerous driving vehicle, such as a sedan or a minivan is displayed.

The operation unit 20 is configured by a general microcomputer including a CPU (Central Processing Unit), a ROM (Read Only Memory), a RAM (Random Access Memory), and the like. Further, the control unit 20 performs control such as uploading image information representing an image captured by the image capturing unit 24 and vehicle information detected by the vehicle information detecting unit 22 at the time of capturing the image, to the cloud server 12. In addition, the control unit 20 may perform a process of detecting, as a dangerous vehicle, a vehicle 14 having a possibility of tailgating, pulling-over, swerving, or the like. For example, the vehicle 14 is identified in the image information obtained by the image capture by the image capturing unit 24, and the vehicle 14 having a size in the image of the identified vehicle 14 equal to or larger than a predetermined size is detected as a dangerous vehicle. Alternatively, the vehicle 14 in the image information may be specified, the inter-vehicle distance may be estimated from the size of the specified vehicle 14 in the image, and the vehicle 14 within a predetermined distance may be detected as a dangerous vehicle. Alternatively, when a radar device is provided as the vehicle information detection unit 22, the distance to a surrounding vehicle is detected based on the vehicle information, and the vehicle 14 that is surrounding vehicle at a distance that is within a predetermined distance may be detected as a dangerous vehicle. Alternatively, a vehicle 14 where the distance to the surrounding vehicle detected based on the image information and the distance to the surrounding vehicle detected based on the vehicle information are both within a predetermined distance may be detected as a dangerous vehicle.

On the other hand, the cloud server 12 includes a central processing unit 30, a central communication unit 36, and a DB (database) 38.

The central processing unit 30 is configured by a general microcomputer including a CPU (Central Processing Unit), a ROM (Read Only Memory), a RAM (Random Access Memory), and the like. The central processing unit 30 has functions of an image processing unit 32 and a processing order changing unit 34. The central processing unit 30 performs processing to accumulate image information and vehicle information transmitted from the vehicle-mounted device 16 in the DB 38 and convert the information into a database. In addition, based on the image information, processing is performed to specify the characteristics of the dangerously-driven vehicle, such as tailgating, pulling-over, swerving, or the like. Each function of the central processing unit 30 is realized by executing a program stored in a ROM or the like. The processing order changing unit 34 corresponds to a modification unit, and the DB 38 corresponds to a receiving unit.

The image processing unit 32 performs various types of image processing on the image information received from the vehicle-mounted device 16 to detect traffic conditions, to detect disasters such as floods and landslides, and to specify characteristics of dangerously-driven vehicles. In the present embodiment, as an example, the image processing unit 32 performs image processing on the image information received from the vehicle-mounted device 16 to specify the characteristics of the dangerously-driven vehicle. Specifically, processing is performed to specify features such as the color and the license plate number of the dangerous driving vehicle from the image information. Note that the image processing unit 32 may perform processing to detect a vehicle 14 having a possibility of tailgating, pulling-over, swerving, or the like as a dangerous vehicle, similarly to the control unit 20 of the vehicle-mounted device 16. For example, the vehicle 14 is identified in the image information, and the vehicle 14 having a size in the image of the identified vehicle 14 equal to or larger than a predetermined size is detected as a dangerous vehicle. Alternatively, the vehicle 14 in the image information may be specified, the inter-vehicle distance may be estimated from the size of the specified vehicle 14 in the image, and the vehicle 14 within a predetermined distance may be detected as a dangerous vehicle. Alternatively, when a radar device is provided as the vehicle information detection unit 22, the distance to a surrounding vehicle is detected based on the vehicle information, and the vehicle 14 that is a surrounding vehicle at a distance that is within a predetermined distance may be detected as a dangerous vehicle. Alternatively, a vehicle 14 where the distance to the surrounding vehicle detected based on the image information and the distance to the surrounding vehicle detected based on the vehicle information are both within a predetermined distance may be detected as a dangerous vehicle. The surroundings are, for example, within a predetermined distance range around the vehicle 14 such as within a radius of 10 m around the vehicle 14.

The processing order changing unit 34 changes the processing order of the image processing performed by the image processing unit 32 when a dangerous driving vehicle is detected. Specifically, when a dangerous driving vehicle is detected, the priority level of the image information received from the vehicles around the vehicle in which the dangerous driving vehicle is detected is changed to be higher than for other vehicles, and the identification of the dangerous driving vehicle is prioritized. In addition, the detection of the dangerous vehicle may be performed by the detection of the dangerous vehicle by the control unit 20 of the vehicle-mounted device 16 or the detection of the dangerous vehicle by the image processing unit 32 of the cloud server 12.

The central communication unit 36 establishes communication with the vehicle-mounted device 16 via the communication network 18 and transmits and receives information such as image information and vehicle information.

The DB 38 receives the image information and the vehicle information from the vehicle-mounted device 16 and stores the received image information and the vehicle information in association with each other.

In the information processing system 10 configured as described above, the image information captured by the image capturing unit 24 of the vehicle-mounted device 16 is transmitted to the cloud server 12 together with the vehicle information including at least the position information and accumulated in the DB 38.

The cloud server 12 specifies the characteristics of the dangerous driving vehicle such as tailgating, pulling-over, or swerving, by the image processing unit 32 performing the image processing based on the image information stored in the DB 38. Then, the cloud server 12 provides a service to provide notification of the information indicating the characteristics of the dangerous driving vehicle to the surrounding vehicles 14, and calls attention thereto.

However, since an enormous amount of image information is accumulated in the DB 38, if the image processing is performed in order, then it will take a long time to identify the characteristics of the dangerous driving vehicle and the processing load increases.

Therefore, in the present embodiment, when a dangerous driving vehicle is detected, the processing order changing unit 34 changes the processing order such that the priority level for image processing for, among the image information accumulated by the DB 38, image information received from another vehicle in the vicinity of the vehicle that has detected the dangerously-driven vehicle, is set higher than that for a vehicle that is not in the vicinity of the vehicle that has detected the dangerously-driven vehicle. As a result, the processing for identifying the characteristic of the dangerous driving vehicle can be accelerated.

Next, the detailed processing performed in the information processing system 10 according to the present embodiment configured as described above will be described. Hereinafter, the first and second embodiments will be described as detailed processing examples.

First Exemplary Embodiment

First, a flow of the detailed processing performed by the vehicle-mounted device 16 of the information processing system 10 according to the first embodiment will be described. FIG. 3 is a flowchart showing an example of a flow of processing performed by the vehicle-mounted device 16 of the information processing system 10 according to the present embodiment. The processing of FIG. 3 is started, for example, every predetermined time period. The predetermined time period may be, for example, 10 seconds.

In step 100, the control unit 20 acquires the image information and the vehicle information, and proceeds to step 102. That is, in addition to acquiring the image information obtained by the imaging j photography of the imaging part 24, the vehicle information detected by the vehicle information detection part 22 is acquired.

In step 102, the control unit 20 determines whether or not there is a dangerous vehicle that is thought to be tailgating, pulling-over, swerving, or the like. In this determination, the presence of a dangerous vehicle that may be a dangerous driving vehicle is determined as a temporary determination of a dangerous driving vehicle. For example, based on the image information, it is determined whether or not the size of a vehicle 14 to the rear in the image is equal to or larger than a predetermined size, thereby determining the presence or absence of a vehicle 14 that appears to be a tailgating vehicle. Alternatively, based on the image information, it is determined whether or not there is a dangerous vehicle whose distance to a nearby vehicle is within a predetermined distance. Alternatively, when a radar device is provided as the vehicle information detection unit 22, the distance to the nearby vehicle is detected based on the vehicle information, and it is determined whether or not there is a dangerous vehicle at a nearby vehicle distance that is within a predetermined distance. Alternatively, it is determined whether or not there is a dangerous vehicle where the distance to the surrounding vehicle detected based on the image information and the distance to the surrounding vehicle detected based on the vehicle information are both within a predetermined distance. When the determination is negative, the process proceeds to step 104, and when the determination is affirmative, the process proceeds to step 106.

In step 104, the control unit 20 adds the vehicle information to the image information, and transmits this information to the cloud server 12 via the communication unit 26 and the communication network 18, and the processing proceeds to step 108.

On the other hand, in step 106, the control unit 20 adds the vehicle information and the dangerous vehicle information to the image information, transmits the information to the cloud server 12 via the communication unit 26 and the communication network 18, and the processing proceeds to step 108. Steps 104 and 106 correspond to the transmitting unit.

In step 108, the control unit 20 determines whether or not dangerous driving vehicle information has been received from the cloud server 12. In this determination, it is determined whether or not the dangerous driving vehicle information specified by the processing of the cloud server 12 described below has been received from the cloud server 12. If the determination is affirmative, the processing proceeds to step 110, and if the determination is negative, the series of processing is ended.

In step 110, the control unit 20 informs the driver of the dangerous driving vehicle information and ends the series of processing. For example, the control unit 20 gets the occupant's attention by displaying the dangerous driving vehicle information received from the cloud server 12 on the display unit 28. Further, the dangerous driving vehicle information may be, for example, reported by sound. When the image information of the dangerous driving vehicle is transmitted from the cloud server 12, the image of the dangerous driving vehicle may be displayed on the display unit 28.

Next, detailed processing performed by the cloud server 12 of the information processing system 10 according to the first embodiment will be described. FIG. 4 is a flowchart illustrating an example of a flow of processing performed by a cloud server 12 of the information processing system 10 according to the present embodiment. Note that in the processing of FIG. 4, the image information is transmitted from the vehicle-mounted device 16 to the cloud server 12 at predetermined time intervals. Therefore, for example, the processing begins when the cloud server 12 receives the image information from the several vehicle-mounted devices 16, and the image information is stored in the DB 38.

In step 200, the central processing unit 30 determines whether or not the image information received from the vehicle-mounted device 16 and stored in the DB 38 includes image information to which dangerous vehicle information has been added. That is, it is determined whether or not the image information transmitted from the vehicle-mounted device 16 includes image information to which dangerous vehicle information is added by the processing of step 106 described above. When the determination is negative, the series of processing is ended, and when the determination is affirmative, the processing proceeds to step 202.

In step 202, the processing order changing unit 34 changes the processing order of the image processing by the image processing unit 32, and proceeds to step 204. Specifically, the priority order of the image processing for image information transmitted from the vehicles around the vehicle that has transmitted the dangerous vehicle information is changed to be higher than that of other vehicles.

In step 204, the image processing unit 32 identifies the characteristics of the dangerous driving vehicle from the image information by image processing, and proceeds to step 206. For example, if a vehicle in the image information is specified, the inter-vehicle distance is estimated from the size of the specified vehicle in the image, and the vehicle exists within a predetermined distance, a dangerous driving vehicle is determined to exist. Then, processing is performed to specify features such as the color and the license plate number of the dangerous driving vehicle from the image information. That is, the dangerous driving vehicle is specified by sequentially performing the image processing on the image information according to the changed priority order, and the characteristics of the dangerous driving vehicle are specified, such as "a station wagon with license plate number XX-XX". Then, for example, when identification has been achieved with a probability of 80% or more from the image processing of the image information of three vehicles, the identification of the dangerous driving vehicle is ended. Alternatively, the identification of the dangerous driving vehicle may be stopped when the shape, color, and license plate number of a vehicle 14 such as a station wagon, sedan, or truck can be identified. Alternatively, the process may be stopped when at least one of the shape, the color, or the license plate number can be specified.

In step 206, the central processing unit 30 selects a transmission destination of dangerous driving vehicle information representing the characteristics of the dangerous driving vehicle identified by the image processing unit 32, and proceeds to step 208. The selection of the transmission destination selects, for example, a vehicle in the vicinity of the vehicle that has transmitted the dangerous vehicle information, a vehicle among the vehicles in the vicinity of the vehicle that has transmitted image information including a dangerous driving vehicle, or a vehicle located in the traveling direction of the vehicle that has transmitted the dangerous vehicle information.

In step 208, the central processing unit 30 transmits the dangerous driving vehicle information to the selected vehicle and ends the series of processing. As a result, in the vehicle that receives the dangerous driving vehicle information, the determination in step 110 described above is affirmative, and the occupant is notified of the dangerous driving vehicle information. Note that step 208 corresponds to the notification unit.

As described above, in the present embodiment, since, when a dangerous driving vehicle is detected, the priority level of the processing of the image information of another vehicle in the vicinity of the vehicle that has detected the dangerous driving vehicle is set to be higher than others, the processing for specifying the dangerous driving vehicle can be accelerated, thereby allowing for the dangerous driving vehicle to be quickly specified.

Second Exemplary Embodiment

Next, detailed processing performed in the information processing system 10 according to the second embodiment will be described.

In the first embodiment, an example in which the presence or absence of a dangerous vehicle is detected at the side of the vehicle-mounted device 16 has been described, but in the present embodiment, the configuration is such that the presence or absence of a dangerous vehicle is not detected by the vehicle-mounted device 16, and instead, the presence or absence of a dangerous vehicle is detected at the side of the cloud server 12.

FIG. 5 is a flowchart showing an example of a flow of processing performed by the vehicle-mounted device 16 of the information processing system 10 according to the present embodiment. The processing of FIG. 5 is started, for example, every predetermined time period. The predetermined time period may be, for example, 10 seconds. Further, in the present embodiment, processing is performed by omitting the processing of steps 102 and 106 in FIG. 3, and explanation is given on the basis that processing that is the same as in FIG. 3 is assigned the same reference numeral.

In step 100, the control unit 20 acquires the image information and the vehicle information, and proceeds to step 104. That is, in addition to acquiring the image information obtained by the imaging of the imaging part 24, the vehicle information detected by the vehicle information detection part 22 is acquired.

In step 104, the control unit 20 adds the vehicle information to the image information, and transmits this information to the cloud server 12 via the communication unit 26 and the communication network 18, and the processing proceeds to step 108.

In step 108, the control unit 20 determines whether or not dangerous driving vehicle information has been received from the cloud server 12. In this determination, it is determined whether or not the dangerous driving vehicle information specified by the processing of the cloud server 12 described below has been received. If the determination is affirmative, the processing proceeds to step 110, and if the determination is negative, the series of processing is ended.

In step 110, the control unit 20 informs the driver of dangerous driving vehicle information and ends the series of processing. For example, the control unit 20 gets the occupant's attention by displaying the dangerous driving vehicle information received from the cloud server 12 on the display unit 28. Further, the dangerous driving vehicle information may be reported by sound. When the image information of the dangerous driving vehicle is transmitted from the cloud server 12, the image of the dangerous driving vehicle may be displayed on the display unit 28.

Next, detailed processing performed by the cloud server 12 of the information processing system 10 according to the second embodiment will be described. FIG. 6 is a flowchart illustrating an example of a flow of processing performed by a cloud server 12 of the information processing system 10 according to the present embodiment. Note that in the processing of FIG. 6, the image information is transmitted from the vehicle-mounted device 16 to the cloud server 12 at predetermined time intervals. Therefore, for example, the processing begins when the cloud server 12 receives the image information from several vehicle-mounted devices 16, and the image information is stored in the DB 38. Further, processing that is the same as in the processing of FIG. 4 will be described with the same reference numerals assigned.

In step 201A, the central processing unit 30 performs processing of detecting the presence or absence of a dangerous vehicle, and then proceeds to step 201B. In the process of detecting the presence or absence of a dangerous vehicle, for example, the image processing unit 32 sequentially processes at least one of the image information or the vehicle information accumulated in the DB 38 to detect the presence or absence of a dangerous vehicle. For example, processing for detecting the presence or absence of a dangerous vehicle whose distance to a nearby vehicle is within a predetermined distance based on the image information is sequentially performed on the accumulated image information. Alternatively, based on the vehicle information added to the image information accumulated in the DB 38, processing for detecting the presence or absence of a dangerous vehicle within a predetermined distance to the surrounding vehicles is sequentially performed on the accumulated vehicle information. The vehicle information may be a detection result of a radar device or the like, for example. Alternatively, based on the image information and the vehicle information, processing for detecting the presence or absence of a dangerous vehicle whose distance to the surrounding vehicle is within a predetermined distance is sequentially performed on the accumulated vehicle information. Note that step 201A corresponds to a detection unit.

In step 201B, the central processing unit 30 determines whether or not there is a dangerous vehicle from the result of the processing for detecting the presence or absence of a dangerous vehicle. If the determination is affirmative, the processing proceeds to the above-described step 202, and if the determination is negative, the series of processing is ended.

In step 202, the processing order changing unit 34 changes the processing order of the image processing by the image processing unit 32, and proceeds to step 204. Specifically, the priority level for the image processing for image information transmitted from the vehicles around the vehicle that has transmitted the image information in which the dangerous vehicle is detected, is changed to be higher than that for other vehicles.

In step 204, the image processing unit 32 identifies the characteristics of the dangerous driving vehicle from the image information by image processing, and proceeds to step 206. For example, if a vehicle in the image information is specified, the inter-vehicle distance is estimated from the size of the specified vehicle in the image, and if the vehicle exists within a predetermined distance, a dangerous driving vehicle is determined to exist. Then, processing is performed to specify features such as the color and the license plate number of the dangerous driving vehicle from the image information. That is, the dangerous driving vehicle is specified by sequentially performing the image processing on the image information according to the changed priority order, and the characteristics of the dangerous driving vehicle are specified, such as "a station wagon with license plate number XX-XX". Then, for example, when identification has been achieved with a probability of 80% or more from the image processing of the image information of three vehicles, the identification of the dangerous driving vehicle is ended. Alternatively, the identification of the dangerous driving vehicle may be stopped when the shape, color, and license plate number of a vehicle such as a station wagon, sedan, or truck can be identified. Alternatively, the process may be stopped when at least one of the shape, the color, or the license plate number can be specified.

In step 206, the central processing unit 30 selects a transmission destination of dangerous driving vehicle information representing the characteristics of the dangerous driving vehicle identified by the image processing unit 32, and proceeds to step 208. The selection of the transmission destination selects, for example, a vehicle in the vicinity of the vehicle that has transmitted the dangerous vehicle information, a vehicle, among the vehicles in the vicinity of the vehicle that has transmitted the dangerous vehicle information including a dangerous driving vehicle, or a vehicle located in the traveling direction of the vehicle that has transmitted the dangerous vehicle information.

In step 208, the central processing unit 30 transmits the dangerous driving vehicle information to the selected other vehicle and ends the series of processing. As a result, in the vehicle to which the dangerous driving vehicle information is transmitted, the determination in step 108 described above is affirmative, and the occupant is notified of the dangerous driving vehicle information.

As described above, also as a mode in which the presence/absence of the dangerous vehicle is determined at the cloud server 12 side, the processing for identifying the dangerous driving vehicle can be accelerated as in the above-described embodiment.

Further, the processing performed by each part of the information processing system 10 in each of the above-described embodiments has been described as software processing performed by executing a program, but it is not limited thereto. For example, the processing may be performed by hardware. Alternatively, the processing may be a combination of both software and hardware. In the case of software processing, the program may be stored in various kinds of non-transitory recording media and distributed.

The present disclosure is not limited by the foregoing description. In addition to the foregoing description, numerous modifications may be embodied within a technical scope not departing from the gist of the disclosure.

The present disclosure provides an information processing device, an information processing system, and a recording medium storing an information processing program, capable of accelerating processing for identifying a dangerously-driven vehicle.

One aspect of the present disclosure is an information processing device, including: a receiver unit configured to receive, from each of several vehicles, both image information captured by an image capture device installed at the vehicle, and vehicle information including position information on the vehicle; an image processing unit configured to perform image processing identifying a characteristic of a dangerously-driven vehicle based on the image information; and a modification unit configured to, in a case in which a dangerously-driven vehicle has been detected, modify a priority level for image processing of, among the image information received by the receiver unit, the image information received from another vehicle in the vicinity of a vehicle that has detected the dangerously-driven vehicle, so as to be a higher priority than for a vehicle that is not in the vicinity of the vehicle that detected the dangerously-driven vehicle.

According to one aspect of the present disclosure, both the image information captured by the image capture unit installed at the vehicle, and the vehicle information including the vehicle position information, is received from each of the several vehicles.

Image processing is performed to identify a characteristic of a dangerously-driven vehicle based on the image information. For example, the characteristics of a dangerously-driven vehicle such as tailgating, pulling-over, or swerving, are identified by image processing.

Further, when a dangerously-driven vehicle has been detected, the priority level of image processing for, among the received image information, image information received from another vehicle in the vicinity of the vehicle that has detected the dangerously-driven vehicle is modified to be higher than that of a vehicle not in the vicinity of the vehicle of the vehicle that has detected the dangerously-driven vehicle. Accordingly, since there is a high possibility that the dangerously-driven vehicle is included in the image information received from another vehicle in the vicinity of the vehicle that has detected the dangerously-driven vehicle, it is possible to speed-up the processing for identifying the dangerously-driven vehicle.

The presence or absence of a dangerously-driven vehicle may be detected at the vehicle side, and the detection results of the dangerously-driven vehicle may further be received from several vehicles. Alternatively, the information processing device may further include a detection unit that detects the presence or absence of a dangerously-driven vehicle.

Moreover, characteristic information representing a characteristic of the identified dangerously-driven vehicle may be reported to several vehicles. As a result, it becomes possible to report the presence of a dangerously-driven vehicle to surrounding vehicles, preceding vehicles, and the like. In this case, if, based on the image processing results, the dangerously-driven vehicle is included in the image information received from another vehicle, the characteristic information may be reported to the other vehicle. As a result, it becomes possible to report the presence of a dangerously-driven vehicle to vehicles in the vicinity of the dangerously-driven vehicle.

The present disclosure may be an information processing system, including: the information processing device of an aspect of the present disclosure; and a vehicle including: an image capture unit that is installed in the vehicle and is configured to capture an image of the vehicle surroundings, and a vehicle information detection unit configured to detect vehicle information including position information on the vehicle, and configured to transmit image information captured by the image capture unit and the vehicle information detected by the vehicle information detection unit.

Alternatively, it may be an information processing program that causes a computer to function as each unit of the information processing device according to an aspect of the present disclosure.

The present disclosure provides an information processing device, an information processing system, and a recording medium storing an information processing program, capable of accelerating processing for identifying a dangerously-driven vehicle.

The invention claimed is:

1. An information processing device, comprising:
a memory; and
a processor coupled to the memory, the processor being configured to:
receive, from each of a plurality of vehicles, image data captured by an image capture device installed at each of the plurality of vehicles so as to capture an image outside of each of the plurality of vehicles, and vehicle information including position information of each of the plurality of vehicles;
perform image processing identifying a characteristic of a dangerously-driven vehicle that is being dangerously-driven that includes at least one of tailgating, pulling-over, or swerving, based on the image data; and
in a case in which the dangerously-driven vehicle has been detected, modify a priority level for image processing of, among the received image data, second image data received from a second vehicle in a vicinity of a first vehicle that has sent first image data in which the dangerously-driven vehicle has been detected, so as to be higher than for another image data that has been sent by a third vehicle other than the second vehicle.

2. The information processing device of claim 1, wherein the processor is further configured to receive detection results of the dangerously-driven vehicle from the plurality of vehicles.

3. The information processing device of claim 1, further comprising a detection unit that detects presence or absence of the dangerously-driven vehicle.

4. The information processing device of claim 1, wherein the processor reports characteristic information representing the characteristic of the identified dangerously-driven vehicle to the plurality of vehicles.

5. The information processing device of claim 4, wherein the processor, based on image processing results, in a case in which the dangerously-driven vehicle is included in the image data received from another vehicle, reports the characteristic information to the another vehicle.

6. An information processing system, comprising:
the information processing device of claim 1; and
a vehicle comprising:
an image capture unit that is installed in the vehicle and is configured to capture an image of vehicle surroundings,
a vehicle information detection unit configured to detect the vehicle information including the position information on the vehicle, and
another processor configured to transmit image data captured by the image capture unit and the vehicle information detected by the vehicle information detection unit.

7. A non-transitory recording medium storing a program that causes a computer to execute information processing, the information processing comprising:
receiving, from each of a plurality of vehicles, image data captured by an image capture unit installed at each of the plurality of vehicles so as to capture an image outside of each of the plurality of vehicles, and vehicle information including position information of each of the plurality of vehicles;

performing image processing identifying a characteristic of a dangerously-driven vehicle that is being dangerously-driven that includes at least one of tailgating, pulling-over, or swerving, based on the image data; and in a case in which the dangerously-driven vehicle has been detected, modifying a priority level for image processing of, among the received image data, second image data received from a second vehicle in a vicinity of a first vehicle that has sent first image data in which the dangerously-driven vehicle has been detected, so as to be higher than for another image data that has been sent by a third vehicle other than the second vehicle.

8. An information processing method, comprising, by a processor:

receiving, from each of a plurality of vehicles, image data captured by an image capture unit installed at each of the plurality of vehicles so as to capture an image outside of each of the plurality of vehicles, and vehicle information including position information of each of the plurality of vehicles;

performing image processing identifying a characteristic of a dangerously-driven vehicle that is being dangerously-driven that includes at least one of tailgating, pulling-over, or swerving, based on the image data; and in a case in which the dangerously-driven vehicle has been detected, modifying a priority level for image processing of, among the received image data, second image data received from a second vehicle in a vicinity of a first vehicle that has sent first image data in which the dangerously-driven vehicle has been detected, so as to be higher than for another image data that has been sent by a third vehicle other than the second vehicle.

* * * * *